United States Patent
Ohta et al.

(10) Patent No.: US 8,971,895 B2
(45) Date of Patent: Mar. 3, 2015

(54) RADIO RESOURCE RANGE SETTING DEVICE, RADIO RESOURCE RANGE SETTING METHOD, AND RECORDING MEDIUM

(75) Inventors: Daisuke Ohta, Tokyo (JP); Takahiro Nobukiyo, Tokyo (JP); Naoto Ishii, Tokyo (JP); Kojiro Hamabe, Tokyo (JP)

(73) Assignee: NEC Corporation, Tokyo (JP)

( * ) Notice: Subject to any disclaimer, the term of this patent is extended or adjusted under 35 U.S.C. 154(b) by 464 days.

(21) Appl. No.: 13/403,481

(22) Filed: Feb. 23, 2012

(65) Prior Publication Data
US 2012/0214529 A1 Aug. 23, 2012

(30) Foreign Application Priority Data
Feb. 23, 2011 (JP) ................. 2011-036659

(51) Int. Cl.
H04W 36/00 (2009.01)
H04W 52/34 (2009.01)
(52) U.S. Cl.
CPC .......... H04W 52/343 (2013.01); H04W 52/346 (2013.01)
USPC ........... 455/438; 455/436; 455/437; 455/443; 455/444; 455/448
(58) Field of Classification Search
CPC .................................................. H04W 52/343
USPC .................. 455/438, 436, 437, 443, 444, 448
See application file for complete search history.

(56) References Cited

U.S. PATENT DOCUMENTS

| | | | | |
|---|---|---|---|---|
| 5,708,968 A * | 1/1998 | Suzuki | ........................... | 455/464 |
| 6,718,172 B1 * | 4/2004 | Cook et al. | ................. | 455/452.2 |
| 8,477,014 B2 * | 7/2013 | Shionozaki | .................... | 340/8.1 |
| 8,755,346 B2 * | 6/2014 | Ohta et al. | ..................... | 370/329 |
| 2011/0244866 A1 * | 10/2011 | Yamamoto et al. | ........... | 455/438 |

OTHER PUBLICATIONS

3GPP TS 36.423 V8.7.0, Sep. 2009, 3 pages.
Bin Fan et al., "A Dynamic Resource Allocation Scheme Based on Soft Frequency Reuse for OFDMA Systems", IEEE 2007 International Symposium on Microwave, Antenna, Propagation and EMC Technologies for Wireless Communications, Aug. 2007, pp. 1-4, IEEE.
Nortel, "Further Discussion on Adaptive Fractional Frequency Reuse", May 2007, pp. 1-7, 3GPP TSG-RAN WG1#49, R1-072376, Kobe, Japan.

* cited by examiner

*Primary Examiner* — Sanh Phu
(74) *Attorney, Agent, or Firm* — Sughrue Mion, PLLC

(57) ABSTRACT

A device acquires load information representing a load of radio communication performed between a base station and a plurality of communication terminals performing radio communication with the base station by using a radio resource allocated by the base station. The device sets in response to the acquired load information, from a first radio resource range and a second radio resource range, a radio resource range that the base station can allocate to an edge communication terminal whose channel quality is less than a predetermined threshold.

20 Claims, 11 Drawing Sheets

BACKGROUND ART

RADIO RESOURCE RANGE SETTING DEVICE, RADIO RESOURCE RANGE SETTING METHOD, AND RECORDING MEDIUM

INCORPORATION BY REFERENCE

This application is based upon and claims the benefit of priority from Japanese patent application No. 2011-036659, filed on Feb. 23, 2011, the disclosure of which is incorporated herein in its entirety by reference.

TECHNICAL FIELD

The present application relates to a radio resource range setting device for allocating a radio resource used for performing radio communication between a base station and a communication terminal.

BACKGROUND ART

A radio communication system compliant with LTE (Long Term Evolution) in 3GPP (Third Generation Partnership Project) is known. This radio communication system is configured by arranging a plurality of base stations so that each of the base stations communicates with a communication terminal (a mobile station) located within a communication area (referred to as a cell hereinafter) allocated to the base station.

The radio communication system uses the same communication band in each of a plurality of cells. Therefore, a difference between the level of a signal transmitted and received by a communication terminal (referred to as an edge terminal hereinafter) located on the border between cells to and from the base station of an own cell (a cell to which the edge terminal belongs) and the level of a signal (i.e., an interference signal) transmitted and received in an adjacent cell (a cell adjacent to the own cell) is small. Thus, there is a fear that the quality of a communication path (the communication path quality) between the edge terminal and the base station of the own cell becomes extremely low (deteriorates).

In order to address such a problem, there is a known technique called FFR (Fractional Frequency Reuse) aiming at suppression of signal interference between cells. The FFR is a technique of limiting allocation of a radio resource (a communication band and transmission power) in the adjacent cell in order to secure the quality of a communication path between the edge terminal and the base station of the own cell.

The FFR is classified into Static FFR in which a method for limiting allocation of a radio resource is not changed and Dynamic FFR in which a method for limiting allocation of a radio resource is changed.

At first, the outline of an operation of a radio communication system in which the Static FFR is applied to a downlink (a communication link for transmitting data from a base station to a communication terminal) will be described.

For the respective cells, the radio communication system sets priority bands that vary with the cell. Next, each communication terminal notifies communication path quality information representing the communication path quality to the base station. Based on the notified communication path quality information, the base station determines whether the communication terminal having notified the communication path quality information is a terminal (referred to as the edge terminal hereinafter) comparatively largely affected by signal interference from the adjacent cell or a terminal (referred to as the center terminal hereinafter) comparatively largely affected by signal interference from the adjacent cell.

After that, the base station allocates a communication band to be used for performing communication with the edge terminal from the set priority band. Moreover, the base station uses preset reference transmission power as transmission power to be used for performing communication with the edge terminal.

Further, the base station allocates a communication band to be used for performing communication with the center terminal from the whole communication band available in the cell. Furthermore, the base station uses limitation transmission power smaller than the reference transmission power, as transmission power to be used for performing communication with the center terminal.

Accordingly, it is possible to increase the communication path quality between the edge terminal and the base station (Non-Patent Document 1).

Next, the outline of an operation of a radio communication system in which the Dynamic FFR is applied to a downlink will be described. In this example, the radio communication system is equipped with three base stations 1 to 3 and seven communication terminals 11 to 13, 21, 22, 31 and 32 as shown in FIG. 1.

To each of the base stations 1 to 3, one cell is allocated. To be specific, a cell C1 is allocated to the base station 1, a cell C2 is allocated to the base station 2, and a cell C3 is allocated to the base station 3. Each of the base stations may be configured so that a plurality of cells can be allocated thereto.

Further, the communication terminals 11 to 13 belong to the cell C1 (i.e., a communication link for performing communication with the base station 1 is established). The communication terminals 21 and 22 belong to the cell C2. The communication terminals 31 and 32 belong to the cell C3. Herein, a case in which the communication terminals 12, 13 and 31 are edge terminals and the other communication terminals 11, 21, 22 and 32 are center terminals will be considered.

In this embodiment, a case in which the radio communication system divides a communication band (a system band) F0 available in the radio communication system into three partial bands F1 to F3, sets the partial band F1 as a priority band of the cell C1, sets the partial band F2 as a priority band of the cell C2 and sets the partial band F3 as a priority band of the cell C3 as shown in FIG. 2 will be considered.

Each of the base stations 1 to 3 notifies a priority band set for the own cell to the adjacent cell in a case that the number of the edge terminals that are due to transmit data is equal to or more than a preset threshold (Non-Patent Document 2). Herein, a case in which the threshold is 2 will be described. Moreover, a case in which each of the base stations 1 to 3 is due to transmit data to all of the communication terminals belonging to the own cell, respectively, will be described.

For example, notification of the priority band to the adjacent cell is performed by using RNTP (Relative Narrowband TX Power) in the LTE downlink. Moreover, notification of the priority band to the adjacent cell is performed by using HII (High Interference Indication) in the uplink (Non-Patent Document 3).

The edge terminals belonging to the cell C1 are the communication terminal 12 and the communication terminal 13. Therefore, the base station 1 notifies the priority band F1 of the cell C1 to the base station 2 to which the cell C2 generating a signal comparatively strongly interfering with a signal transmitted and received by the communication terminal 12 is allocated and the base station 3 to which the cell C3 generating a signal comparatively strongly interfering with a signal transmitted and received by the communication terminal 13 is allocated, respectively.

On the other hand, both the communication terminals 21 and 22 belonging to the cell C2 are the center terminals. Therefore, the base station 2 does not notify the priority band of the cell C2 to any of the base stations. In a like manner, the edge terminal belonging to the cell C3 is the communication terminal 31 alone. Therefore, the base station 3 does not notify the priority band of the cell C3 to any of the base stations.

With reference to FIGS. 3 to 6, a method for allocating a radio resource used for performing radio communication between the base station and the communication terminal will be described more specifically. To the base station 1, the priority band of the adjacent cell is not notified. Therefore, the base station 1 sets transmission power to preset reference transmission power P0 for both the edge terminals and the center terminals as shown in FIG. 3. The reference transmission power P0 is the average value of maximum transmission power that is the maximum value of transmission power that can be simultaneously outputted by the base station 1, over the whole system band F0.

Further, as shown in FIG. 4, the base station 1 allocates communication bands to be used for performing radio communication between the base station 1 and the communication terminals to both the edge terminals and the center terminals from the system band F0.

That it to say, an edge terminal allocatable band FE, which is a communication band that can be allocated as a communication band used for performing radio communication between the base station 1 and the edge terminal, is the system band F0. In a like manner, a center terminal allocatable band FC, which is a communication band that can be allocated as a communication band to be used for performing radio communication between the base station 1 and the center terminal, is also the system band F0. In other words, the base station 1 does not limit a radio resource (both a communication band and transmission power) allocated to the communication terminal.

On the other hand, to the base station 2 and the base station 3, the priority band is notified by the base station 1, respectively. Therefore, as shown in FIG. 5, the base station 2 sets the transmission power for the edge terminal to reference transmission power P0, whereas sets the transmission power for the center terminal to limitation transmission power P1. The limitation transmission power P1 is smaller than the reference transmission power P0 by a preset transmission power difference ΔP.

Further, as shown in FIG. 6, the base station 2 allocates a communication band to be used for radio communication between the base station 2 and the center terminal from the system band F0. That is to say, the center terminal allocatable band FC that is a communication band allocatable as a communication band to be used for performing radio communication between the base station 2 and the center terminal is the system band F0.

On the other hand, as shown in FIG. 6, the base station 2 allocates a communication band to be used for performing radio communication between the base station 2 and the edge terminal, from the communication band except the priority band F1 of the cell C1 in the system band F0. That is to say, the edge terminal allocatable band FE that is a communication band allocatable as a communication band to be used for performing radio communication between the base station 2 and the edge terminal is a communication band composed of the partial band F2 and the partial band F3.

Like the base station 2, the base station 3 allocates a radio resource to the communication terminal belonging to the own cell.

Thus, in a case that the number of edge terminals due to transmit data is equal to or more than a threshold in a certain cell, it is possible by limiting allocation of a radio resource in an adjacent cell to suppress signal interference in a priority band set for the certain cell in the certain cell.

[Non-Patent Document 1] Bin Fan, et al., "A Dynamic Resource Allocation Scheme Based on Soft Frequency Reuse for OFDMA Systems," IEEE 2007 International Symposium on Microwave, Antenna, Propagation and EMC Technologies for Wireless Communications, IEEE, August 2007, pp. 121-125

[Non-Patent Document 2] Nortel, "Further Discussion on Adaptive Fractional Frequency Reuse," May 2007, 3GPP R1-072376 (searched on the Internet on Feb. 15, 2011 <URL: http://www.3gpp.org/ftp/tsg_ran/WG1_RL1/TSGR1_49/Docs/R1-072376.zip>)

[Non-Patent Document 3] 3GPP TS 36.423 V8.7.0, September 2009, pp. 16, 48 and 49

A case in which, as shown in FIG. 7, a radio communication system is equipped with three base stations 1 to 3 and twelve communication terminals 11 to 13, 21 to 24, and 301 to 315 will be assumed. Moreover, a case in which the communication terminals 11 to 13 belong to the cell C1, the communication terminals 21 to 24 belong to the cell C2, and the communication terminals 301 to 315 belong to the cell C3 will be assumed.

In addition, a case in which the communication terminals 12, 13, 23, 24, 314 and 315 are edge terminals and the other communication terminals 11, 21, 22 and 301 to 313 are center terminals will be assumed. Moreover, a case in which each of the base stations 1 to 3 is due to transmit data to all of the communication terminals belonging to the own cell, respectively, will be assumed.

In the cell C3, the number of the communication terminals is comparatively large. Therefore, in the cell C3, a communication band allocated to each of the communication terminals is narrow (small). As the communication band becomes smaller, a throughput decreases. A throughput is the amount of data that a communication terminal receives in a unit time period. Thus, in the cell C3, a throughput for each of the communication terminals is comparatively small.

Furthermore, in a case that the abovementioned threshold is set to 2, the priority band is notified to the base station 3 by the base station 1 and the base station 2, respectively. Therefore, the base station 3 sets the transmission power for the center terminals to the limitation transmission power P1 smaller than the reference transmission power P0. Moreover, the base station 3 allocates a communication band to be used for performing radio communication between the base station 3 and the edge terminal, from the communication band (i.e., the partial band F3) except the priority band F1 of the cell C1 and the priority band F2 of the cell C2 in the system band F0.

Therefore, in the cell C3, a communication band allocated to each of the edge terminals further becomes smaller. Besides, in the cell C3, transmission power allocated to each of the center terminals further becomes smaller. As the transmission power becomes smaller, a throughput decreases. Thus, in the cell C3, there is a fear that throughputs for the respective communication terminals become extremely small.

Thus, the radio communication system described above has a problem that, in a cell in which the number of communication terminals due to transmit data is comparatively large, throughputs for the respective communication terminals become extremely small (deteriorate).

Accordingly, an object of the present invention is to provide a radio resource range setting device capable of solving the aforementioned problems.

SUMMARY

In order to achieve the object, a radio resource range setting device of an illustrative embodiment of the present invention includes:

a load information acquisition unit configured to acquire load information representing a load of radio communication performed between a base station and a plurality of communication terminals performing radio communication with the base station by using a radio resource allocated by the base station; and an allocatable radio resource range setting unit configured to set in response to the acquired load information, from a first radio resource range and a second radio resource range, a radio resource range that the base station can allocate to an edge communication terminal whose channel quality is less than a predetermined threshold.

Further, a radio resource range setting method of another illustrative embodiment of the present invention is a method in a radio resource range setting device including:

acquiring load information representing a load of radio communication performed between a base station and a plurality of communication terminals performing radio communication with the base station by using a radio resource allocated by the base station; and setting in response to the acquired load information, from a first radio resource range and a second radio resource range, a radio resource range that the base station can allocate to an edge communication terminal whose channel quality is less than a predetermined threshold.

Further, a recording medium of another illustrative embodiment of the present invention is a computer-readable recording medium storing a radio resource range setting program comprising instructions for causing an information processing device to execute processes of:

acquiring load information representing a load of radio communication performed between a base station and a plurality of communication terminals performing radio communication with the base station by using a radio resource allocated by the base station; and setting in response to the acquired load information, from a first radio resource range and a second radio resource range, a radio resource range that the base station can allocate to an edge communication terminal whose channel quality is less than a predetermined threshold.

Further, a radio resource range setting device of another illustrative embodiment of the present invention includes:

a load information acquisition means for acquiring load information representing a load of radio communication performed between a base station and a plurality of communication terminals performing radio communication with the base station by using a radio resource allocated by the base station; and an allocatable radio resource range setting means for setting in response to the acquired load information, from a first radio resource range and a second radio resource range, a radio resource range that the base station can allocate to an edge communication terminal whose channel quality is less than a predetermined threshold.

With the configurations as described above, the present invention can prevent a throughput for a communication terminal from becoming small.

ILLUSTRATIVE EMBODIMENT

Below, respective illustrative embodiments of a radio resource range setting device, a radio resource range setting method and a recording medium according to the present invention will be described with reference to FIGS. 8 to 15.

First Illustrative Embodiment

Configuration

Figure 1:
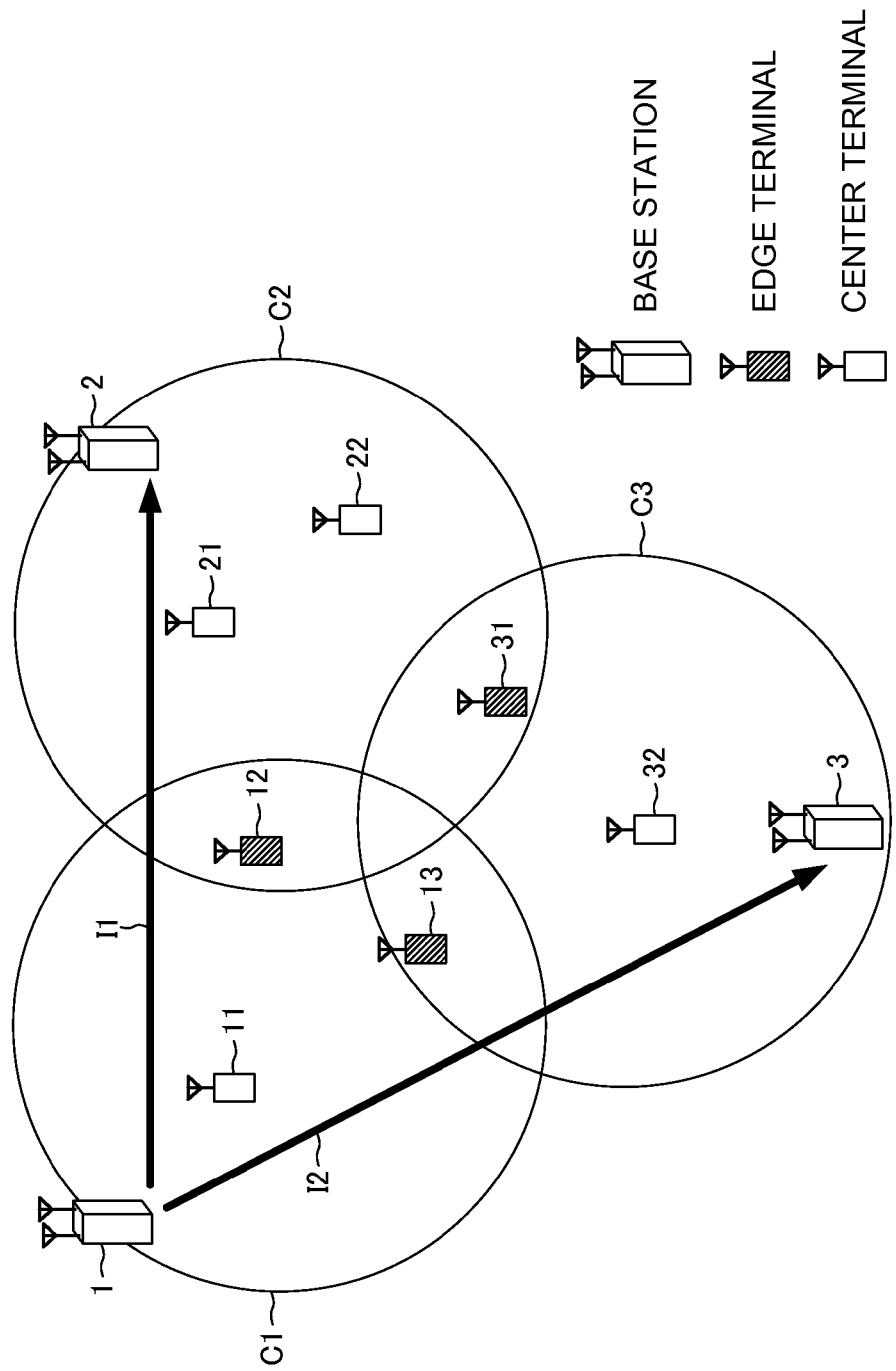
FIG. 1 an explanation diagram conceptually showing an operation of a radio communication system relating to a background technique.
Figure 2:
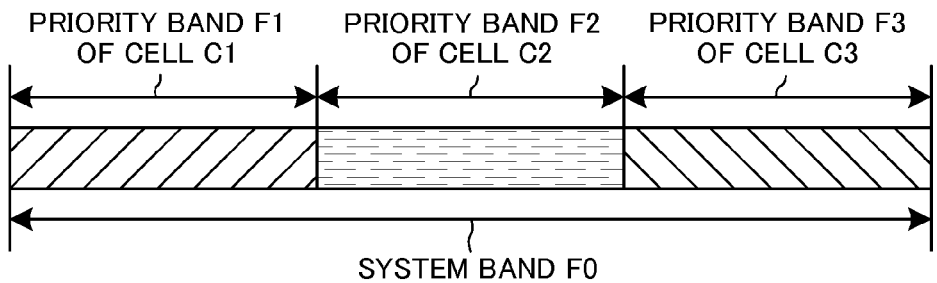
FIG. 2 is an explanation diagram conceptually showing a priority band used in the radio communication system relating to the background technique.
Figure 3:
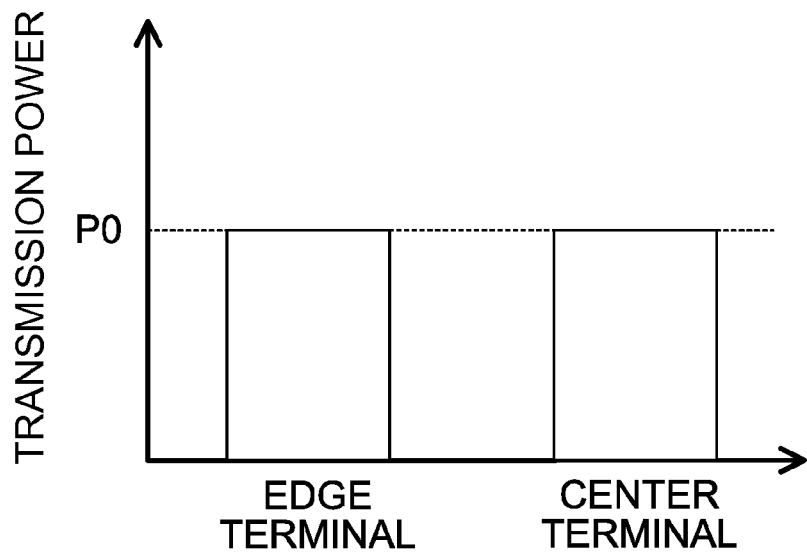
FIG. 3 is an explanation diagram conceptually showing transmission power allocated to an edge terminal and a center terminal in the radio communication system relating to the background technique.
Figure 4:
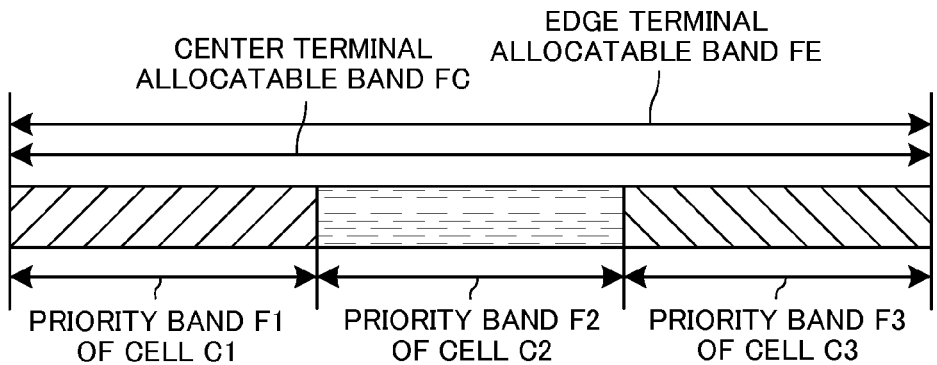
FIG. 4 is an explanation diagram conceptually showing a communication band allocated to the edge terminal and the center terminal in the radio communication system relating to the background technique.
Figure 5:
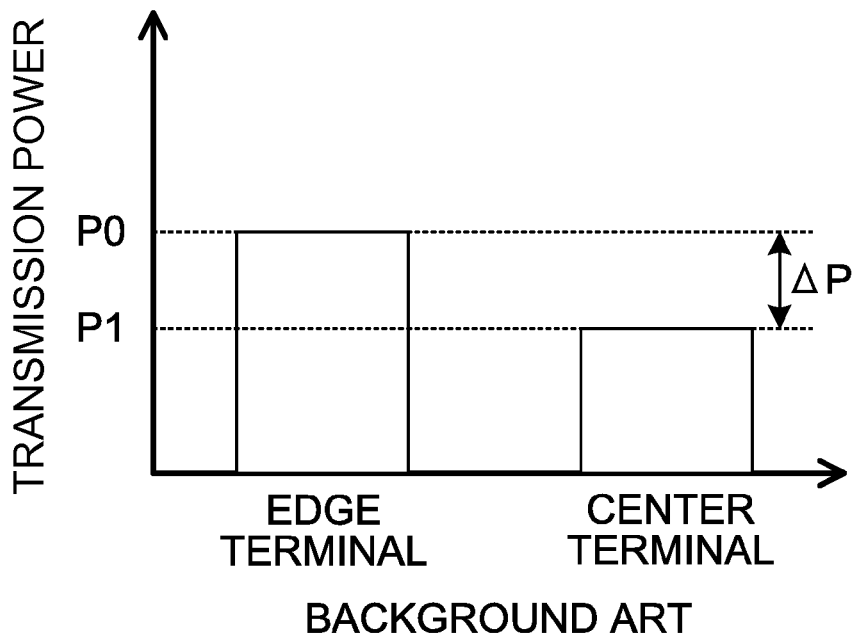
FIG. 5 is an explanation diagram conceptually showing transmission power allocated to the edge terminal and the center terminal in the radio communication system relating to the background technique.
Figure 6:
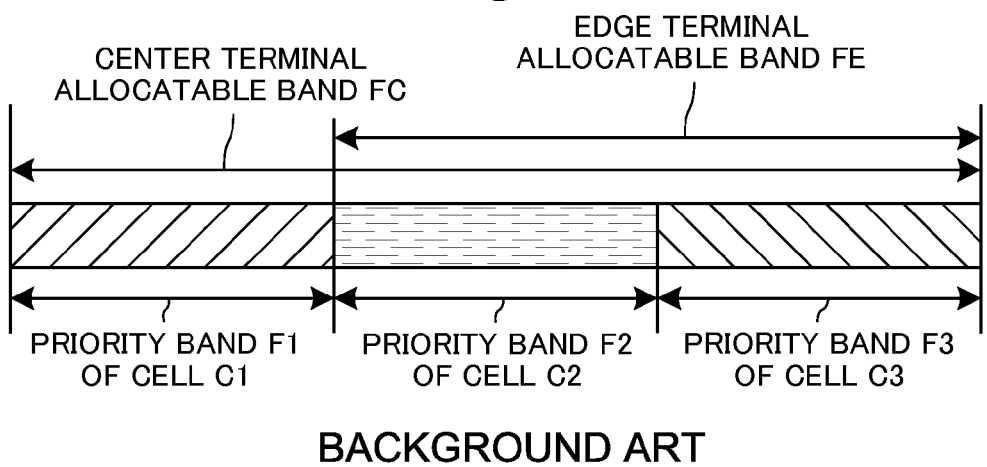
FIG. 6 is an explanation diagram conceptually showing a communication band allocated to the edge terminal and the center terminal in the radio communication system relating to the background technique.
Figure 7:
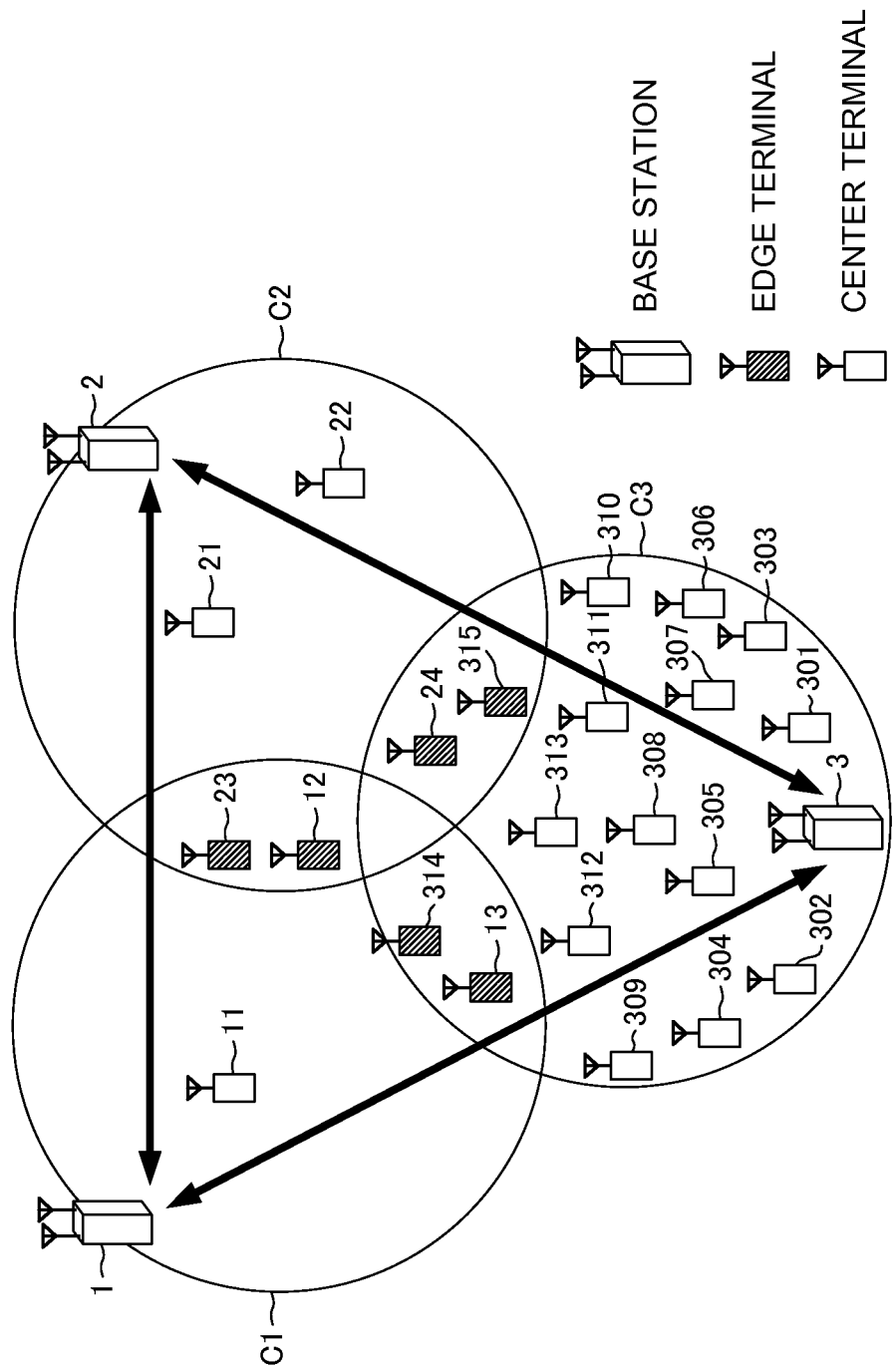
FIG. 7 is an explanation diagram conceptually showing an operation of the radio communication system relating to the background technique.
Figure 8:
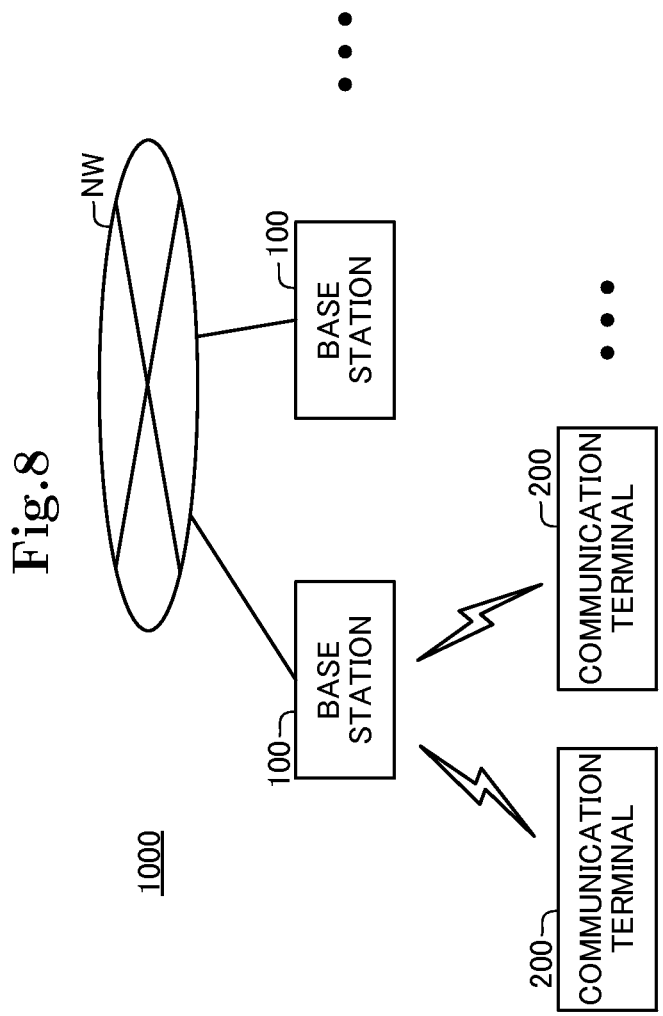
FIG. 8 is a diagram representing a schematic configuration of a radio communication system according to a first illustrative embodiment of the present invention.

As shown in FIG. 8, a radio communication system 1000 according to a first illustrative embodiment includes a plurality of base stations 100 . . . and a plurality of communication terminals 200 . . . . The radio communication system 1000 is a system that the present invention is applied to a downlink (a communication link for transmitting data from the base station 100 to the communication terminal 200) of LTE (Long Term Evolution). Each of the base stations 100 . . . configures a radio resource range setting device.

The plurality of base stations 100 . . . are connected so as to be capable of communicating with each other via a communication line NW. Moreover, to each of the base stations 100, one communication area (cell) is allocated. The respective base stations 100 may be configured so that a plurality of cells can be allocated thereto.

Each of the base stations 100 performs radio communication with the communication terminals 200 located within a cell allocated to the base station 100. Each of the base stations 100 is configured so as to be capable of executing simultaneous radio communication with the respective communication terminals 200 . . . .

Each of the base stations 100 is equipped with an information processing device that is not shown in the drawings. The information processing device is equipped with a CPU (Central Processing Unit) and a storage device (a memory and an HDD (Hard Disk Drive)). Each of the base stations 100 is configured so as to realize a function described later by the CPU's execution of a program stored in the storage device.

Each of the communication terminals 200 is a mobile phone terminal. Each of the communication terminals 200 may be a personal computer, a PHS (Personal Handyphone System), a PDA (Personal Data Assistance, Personal Digital Assistant), a smartphone, a car navigation terminal, a game terminal, or the like.

Each of the communication terminals 200 is equipped with a CPU, a storage device (a memory), an input device (a key button and a microphone), and an output device (a display and a speaker). Each of the communication terminals 200 is configured so as to realize a function described later by the CPU's execution of a program stored in the storage device.

Function

Figure 9:
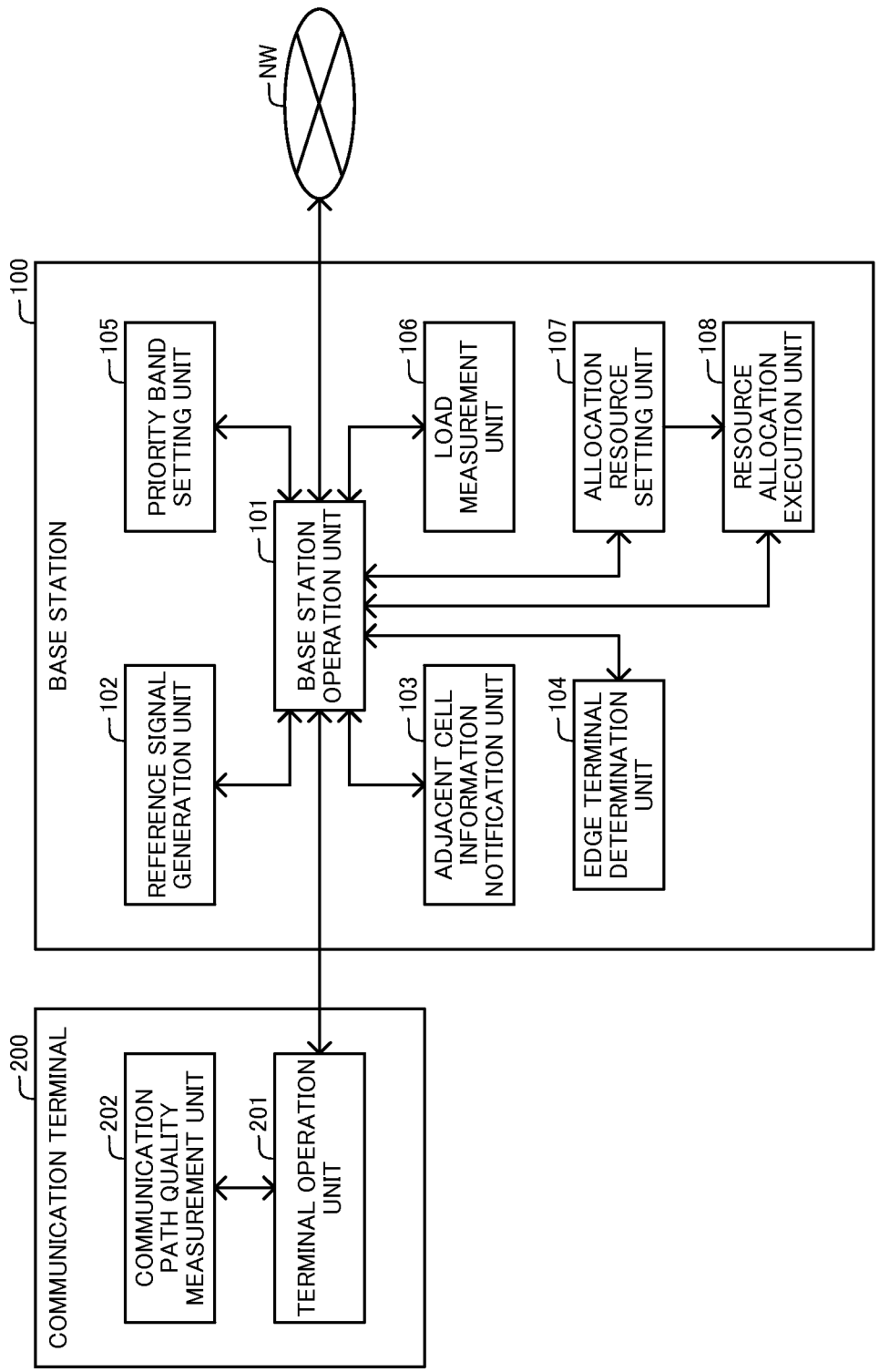
FIG. 9 is a block diagram representing a schematic function of the radio communication system according to the first illustrative embodiment of the present invention.

FIG. 9 is a block diagram representing a function of the radio communication system 1000 configured as described above.

The function of the base station 100 includes a base station operation unit (a priority band information acquisition unit, a communication path quality information acquisition unit) 101, a reference signal generation unit 102, an adjacent cell information notification unit 103, an edge terminal determination unit 104, a priority band setting unit 105, a load measurement unit (a load information acquisition unit) 106, an allocation resource setting unit (an allocatable radio resource range setting unit) 107, and a resource allocation execution unit 108.

The base station operation unit 101 has a function of transmitting and receiving a radio signal between the base station 100 and the connecting communication terminal 200 (i.e., a communication link is established). Moreover, the base station operation unit 101 has a function of performing communication with the other base station 100 connected via the communication line NW. Because the base station operation unit 101 is a function known in a general radio communication system, a detailed description thereof will be omitted.

The reference signal generation unit 102 has a function of generating a predetermined signal (a reference signal) that the communication terminal 200 uses for measuring the communication path quality. The communication path quality is the quality of a communication path between the communication terminal 200 and the base station 100. The base station operation unit 101 has a function of transmitting the reference signal generated by the reference signal generation unit 102 to the communication terminal 200.

The adjacent cell information notification unit 103 has a function of transmitting (notifying) adjacent cell information to the communication terminal 200 via the base station operation unit 101. The adjacent cell information includes cell identification information (e.g., a cell number) for identifying an adjacent cell, which is a cell adjacent to an own cell that is a cell allocated to the base station 100.

The edge terminal determination unit 104 has a function of determining whether the communication terminal 200 is an edge terminal or a center terminal based on communication path quality information (described later) reported by the communication terminal 200 (i.e., received from the communication terminal 200) and generating determination result information representing a determination result. The base station operation unit 101 has a function of transmitting the determination result information generated by the edge terminal determination unit 104 to the priority band setting unit 105 and the allocation resource setting unit 107, respectively.

The priority band setting unit 105 has a function of determining whether to transmit priority band information to an adjacent base station based on the determination result information transmitted from the edge terminal determination unit 104 via the base station operation unit 101. The adjacent base station is the base station 100 that the adjacent cell is allocated. The priority band information is information representing a priority band that is a communication band used preferentially for radio communication in the own cell.

The base station operation unit 101 transmits (notifies) the priority band information to the adjacent base station 100 in a case that the priority band setting unit 105 determines to transmit the priority band information. In this embodiment, the base station operation unit 101 transmits the priority band information as RNTP (Relative Narrowb and TX Power).

Further, the base station operation unit 101 has a function of receiving (acquiring) the priority band information from the adjacent base station.

The load measurement unit 106 has a function of measuring a load on the own cell and generating (acquiring) load information representing the measured load (i.e., information of the load on the own cell). In this embodiment, the load is a load of radio communication performed between the base station 100 and the plurality of communication terminals 200 performing radio communication with this base station 100 by using a radio resource allocated by this base station 100. In this embodiment, the radio resource includes transmission power that is power for transmitting a radio signal, and a communication band.

To be specific, the load is the number of the communication terminals 200 that data to be communicated with the base station 100 exists (in this embodiment, data to be transmitted by the base station 100 exists). The base station operation unit 101 has a function of transmitting the load information generated by the load measurement unit 106 to the allocation resource setting unit 107.

The allocation resource setting unit 107 has a function of setting an allocatable radio resource range based on the load information transmitted from the load measurement unit 106 via the base station operation unit 101 and based on the presence/absence of reception of the priority band information from the adjacent base station 100.

The allocatable radio resource range is the range of the radio resource that the base station 100 can allocate to each of the plurality of communication terminals 200. The allocation resource setting unit 107 has a function of transmitting (reporting) the allocatable radio resource range information representing the set allocatable radio resource range to the resource allocation execution unit 108.

The resource allocation execution unit 108 has a function of allocating a radio resource (transmission power and a communication band) to the respective communication terminals 200 from the allocatable radio resource range represented by the allocatable radio resource range information transmitted by the allocation resource setting unit 107.

The function of the communication terminal 200 includes a terminal operation unit 201 and a communication path quality measurement unit 202. The terminal operation unit 201 has a function of transmitting and receiving a radio signal between the communication terminal 200 and the connecting base station 100 (i.e., a communication link is established). Because the terminal operation unit 201 is a function known in a general radio communication system, a detailed description thereof will be omitted.

The communication path quality measurement unit 202 has a function of measuring a communication path quality based on a reference signal in the adjacent cell identified by the adjacent cell information notified (received) from the base station 100 and the reference signal in the own cell (the cell that the communication terminal 200 belongs to).

The communication path quality is the quality of a communication path between the base station 100 allocated to the own cell and the communication terminal (the own communication terminal) 200. Besides, the communication path quality measurement unit 202 has a function of transmitting (reporting) communication path quality information representing the measured communication path quality to the base station 100 via the terminal operation unit 201.

In this embodiment, the communication path quality measurement unit 202 uses RSRQ (Reference Signal Received Quality) of the reference signal in the own cell and RSRQ of the reference signal in the adjacent cell, as the communication path quality information.

The base station operation unit 101 of the base station 100 has a function of receiving (acquiring) the communication path quality information from the communication terminal 200.

Operation

Next, an operation of the radio communication system 1000 described above will be explained.

Figure 10:
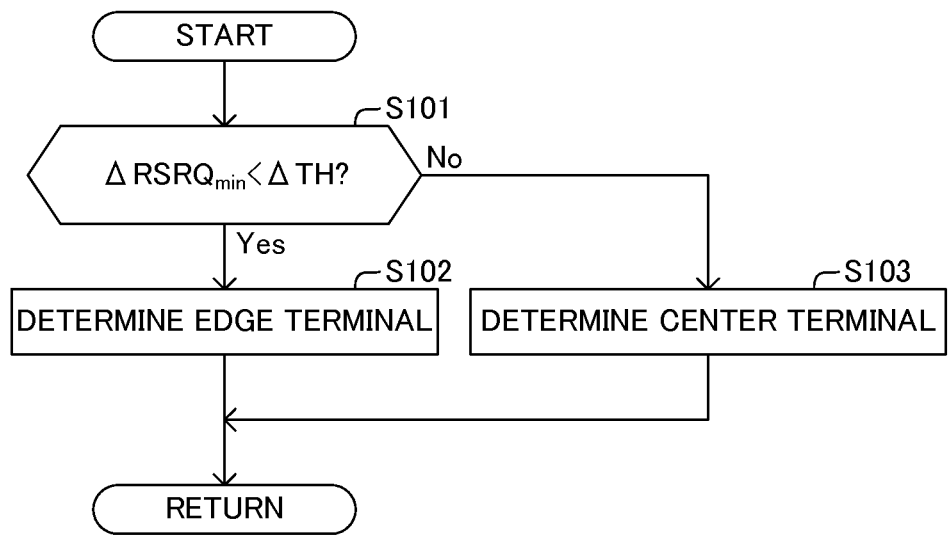
FIG. 10 is a flowchart showing the operation performed by a base station according to the first illustrative embodiment of the present invention to determine whether a communication terminal is an edge terminal or a center terminal.

The base station 100 is configured to perform a function shown by a flowchart in FIG. 10 on the respective communication terminals 200 . . . belonging to the own cell with every preset execution period. By performing this function, the base station 100 determines whether the communication terminal 200 is an edge terminal or a center terminal.

The base station 100 calculates a minimum communication path quality difference $\Delta RSRQ_{min}$ [dB], which is the minimum value of a difference in communication path quality between the own cell and the adjacent cell, based on the communication path quality information received from a certain communication terminal 200 and Formula 1.

$$\Delta RSRQ_{min} = RSRQ_{serv} - MAX\{RSRQ(n)\} \quad \text{[Formula 1]}$$

Herein, $RSRQ_{serv}$ [dB] is the communication path quality in the own cell. Moreover, RSRQ(n) [dB] is the communication path quality in the adjacent cell whose cell identification information is n. Moreover, MAX{X(n)} is a function that returns the maximum value of X(n). That is to say, MAX{RSRQ(n)} represents a communication path quality in an adjacent cell that most strongly interferes with communication between the communication terminal 200 and the base station 100 of the own cell.

Upon start of the flowchart shown in FIG. 10, the base station 100 calculates the minimum communication path quality difference $\Delta RSRQ_{min}$ [dB] as described above. Next, the base station 100 determines whether the calculated minimum communication path quality difference $\Delta RSRQ_{min}$ [dB] is smaller than a preset threshold $\Delta TH$ [dB] (operation S101).

In a case that the minimum communication path quality difference $\Delta RSRQ_{min}$ [dB] is smaller than the threshold $\Delta TH$ [dB], the base station 100 determines "Yes," and proceeds to operation S102 to determine that the processing target communication terminal 200 is an edge terminal. In other words, it can be said that the base station 100 determines the communication terminals 200 . . . that the communication path quality $RSRQ_{serv}$ [dB] is lower than a preset threshold quality (in this embodiment, MAX{RSRQ(n)}+$\Delta TH$) are edge terminals.

On the other hand, the minimum communication path quality difference $\Delta RSRQ_{min}$ [dB] is equal to or more than the threshold $\Delta TH$ [dB], the base station 100 determines "No" at operation S101 described above, and proceeds to operation S103 to determine that the processing target communication terminal 200 is a center terminal. In other words, it can be said that the base station 100 determines the communication terminals 200 . . . that the communication path quality $RSRQ_{serv}$ [dB] is equal to or higher than the threshold quality (in this embodiment, MAX{RSRQ(n)}+$\Delta TH$) are center terminals.

Then, the base station 100 ends the processing of this flowchart.

Figure 11:
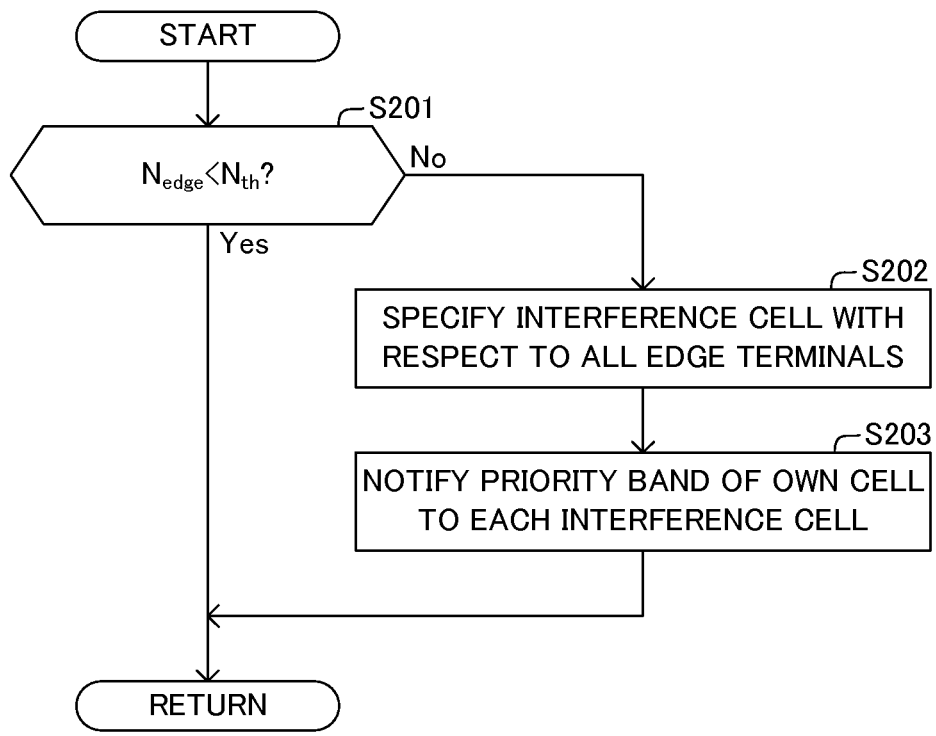
FIG. 11 is a flowchart showing the operation performed by the base station according to the first illustrative embodiment of the present invention to transmit priority band information.

Further, the base station 100 is configured to perform a function shown by a flowchart in FIG. 11 after completing execution of the program shown in FIG. 10. The base station 100 performs the function shown in FIG. 11, thereby notifying the priority band information to the adjacent base station.

Upon start of processing of the flowchart shown in FIG. 11, the base station 100 acquires an edge terminal number $N_{edge}$. The edge terminal number $N_{edge}$ is the number of the communication terminals 200 . . . determined as edge terminals at operation S102 described above and that data to be transmitted by the base station 100 exists, among the communication terminals 200 . . . belonging to the own cell.

Then, the base station 100 determines whether the acquired edge terminal number $N_{edge}$ is smaller than a preset threshold terminal number $N_{th}$ (operation S201).

In a case that the edge terminal number $N_{edge}$ is smaller than the threshold terminal number $N_{th}$, the base station 100 determines "Yes" and ends the processing of this flowchart without executing processes of operations S202 and 203. That is to say, in this case, the priority band information is not transmitted to the adjacent base station, and therefore, interference in radio communication in the priority band set for the own cell by radio communication in the adjacent cell is not suppressed.

On the other hand, in a case that the edge terminal number $N_{edge}$ is equal to or more than the threshold terminal number $N_{th}$, the base station 100 determines "No," and proceeds to operation S202 to specify an interference cell for each of the communication terminals 200 . . . (may be referred to as the edge terminals hereinafter) determined as edge terminals. The interference cell is a cell that generates a radio signal comparatively strongly interfering with a radio signal transmitted and received between the edge terminal and the base station 100 of the own cell, among the adjacent cells.

In this embodiment, the base station 100 determines an adjacent cell satisfying the condition represented by Formula 2 as the interference cell. That is to say, the base station 100 determines, as the interference cell, an adjacent cell that a value obtained by subtracting the communication path quality of an adjacent cell from the communication path quality of the own cell is smaller than a threshold among the adjacent cells.

$$RSRQ_{serv} - RSRQ(n) < \Delta TH \quad \text{[Formula 2]}$$

Herein, ΔTH [dB] is the same value as ΔTH [dB] used at operation S101 described above. The base station 100 may use a threshold different from ΔTH [dB] in Formula 2.

Next, the base station 100 transmits priority band information representing a priority band set for the own cell, to the adjacent base stations 100 . . . allocated to the respective interference cells all specified at operation S202 (operation S203).

Then, the base station 100 ends the processing of this flowchart.

Thus, the base station 100 can notify the priority band of the own cell to only the adjacent base stations 100 . . . that an adjacent cell comparatively strongly interfering with a radio signal transmitted and received between the edge terminal belonging to the own cell and the base station 100 of the own cell is allocated.

Figure 12:
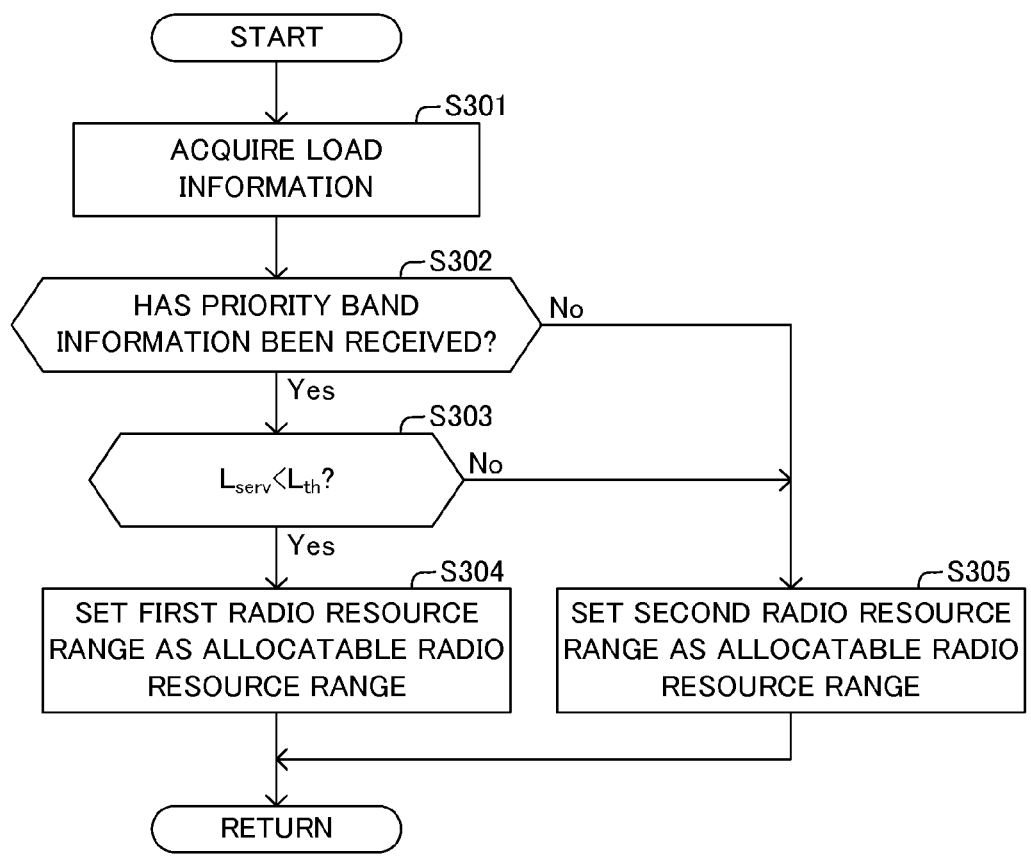
FIG. 12 is a flowchart showing the operation performed by the base station according to the first illustrative embodiment of the present invention to set an allocatable radio resource range.

Further, the base station 100 is configured to perform a function shown by a flowchart in FIG. 12 after completing execution shown in FIG. 11. The base station 100 perform a function shown in FIG. 12, thereby setting the allocatable radio resource range based on the measured load and presence/absence of reception of the priority band information from the adjacent base station 100.

Upon start of processing of the flowchart shown in FIG. 12, the base station 100 acquires load information (operation S301). The load information is information representing the number (load) $L_{serv}$ of the communication terminals 200 that data to be communicated with the base station 100 exists (in this embodiment, data to be transmitted by the base station 100 exists), among the communication terminals 200 . . . belonging to the own cell.

Next, the base station 100 determines whether the priority band information has already been received from any of the adjacent base stations 100 . . . (presence/absence of reception of the priority band information) (operation S302).

Firstly, a case in which the base station 100 has already received the priority band information and the load $L_{serv}$ represented by the load information is smaller than a threshold load $L_{th}$ described later will be assumed.

In this case, the base station 100 determines "Yes" at operation S302, and proceeds to operation S303 to determine whether the load $L_{serv}$ represented by the load information is smaller than the preset threshold load $L_{th}$. In accordance with the assumption, the base station 100 determines "Yes" and proceeds to operation S304.

Then, the base station 100 sets a first radio resource range as the allocatable radio resource range.

For the communication terminal 200 determined as an edge terminal, the first radio resource range is the range of a radio resource that a communication band is a portion other than a priority band represented by received priority band information of the whole available communication band (a communication band available in the radio communication system 1000, i.e., a system band) and transmission power is preset reference transmission power.

Moreover, for the communication terminal determined as a center terminal, the first radio resource range is the range of a radio resource that a communication band is the whole available communication band and transmission power is limitation transmission power smaller than the reference transmission power.

Thus, in a case that the load on the own cell is comparatively low, the base station 100 sets a radio resource range (the first radio resource range) that is more limited than a range including all available radio resource, as the allocatable radio resource range.

Then, the base station 100 ends the processing of this flowchart.

For the communication terminal 200 determined as a center terminal, the first radio resource range may be the range of a radio resource that a communication band is the whole available communication band and transmission power is the reference transmission power.

Next, a case in which the base station 100 has not received any priority band information will be assumed. In this case, the base station 100 determines "No" at operation S302 and proceeds to operation S305. Then, the base station 100 sets a second radio resource range larger than the first radio resource, as the allocatable radio resource range.

The second radio resource range is the range of a radio resource that a communication band is the system band and transmission power is the reference transmission power. The second radio resource range is the same for both the communication terminal 200 determined as an edge terminal and the communication terminal 200 determined as a center terminal.

Then, the base station 100 ends the processing of this flowchart.

Next, a case in which the base station 100 has already received priority band information and the load $L_{serv}$ represented by load information is equal to or more than the threshold load $L_{th}$ will be assumed. In this case, the base station 100 determines "Yes" at operation S302 and determines "No" at operation S303, and proceeds to operation S305. Then, the base station 100 sets the second radio resource range larger than the first radio resource range, as the allocatable radio resource range.

Thus, in a case that the load on the own cell is comparatively high, the base station 100 sets a range including all available radio resource (the second radio resource range) as the allocatable radio resource range.

Further, after completing execution shown in FIG. 12, the base station 100 allocates a radio resource to the respective communication terminals 200 . . . belonging to the own cell from the set allocatable radio resource range.

As described above, according to the base station 100 of the first illustrative embodiment of the present invention, in a case that a load of radio communication is comparatively small, a radio resource is allocated to the communication terminals 200 . . . from a relatively small radio resource range. Consequently, it is possible to increase the communication path quality in an adjacent cell, which is a communication area adjacent to an own cell that is a communication area allocated to the base station 100.

On the other hand, in a case that a load of radio communication is comparatively large, a radio resource is allocated to the communication terminals 200 . . . from a relatively large radio resource range. Consequently, it is possible to prevent throughputs for the communication terminals 200 . . . in the own cell from becoming extremely small.

Thus, according to the base station 100 of the first illustrative embodiment, it is possible to prevent throughputs for the communication terminals 200 . . . from becoming extremely small while increasing the communication path quality.

Second Illustrative Embodiment

Next, a radio communication system according to a second illustrative embodiment of the present invention will be described. The radio communication system according to the second illustrative embodiment is different from the radio communication system according to the first illustrative embodiment in determining a threshold load based on a load on an adjacent cell. Therefore, a description will be made below focusing on the different point.

Function

Figure 13:
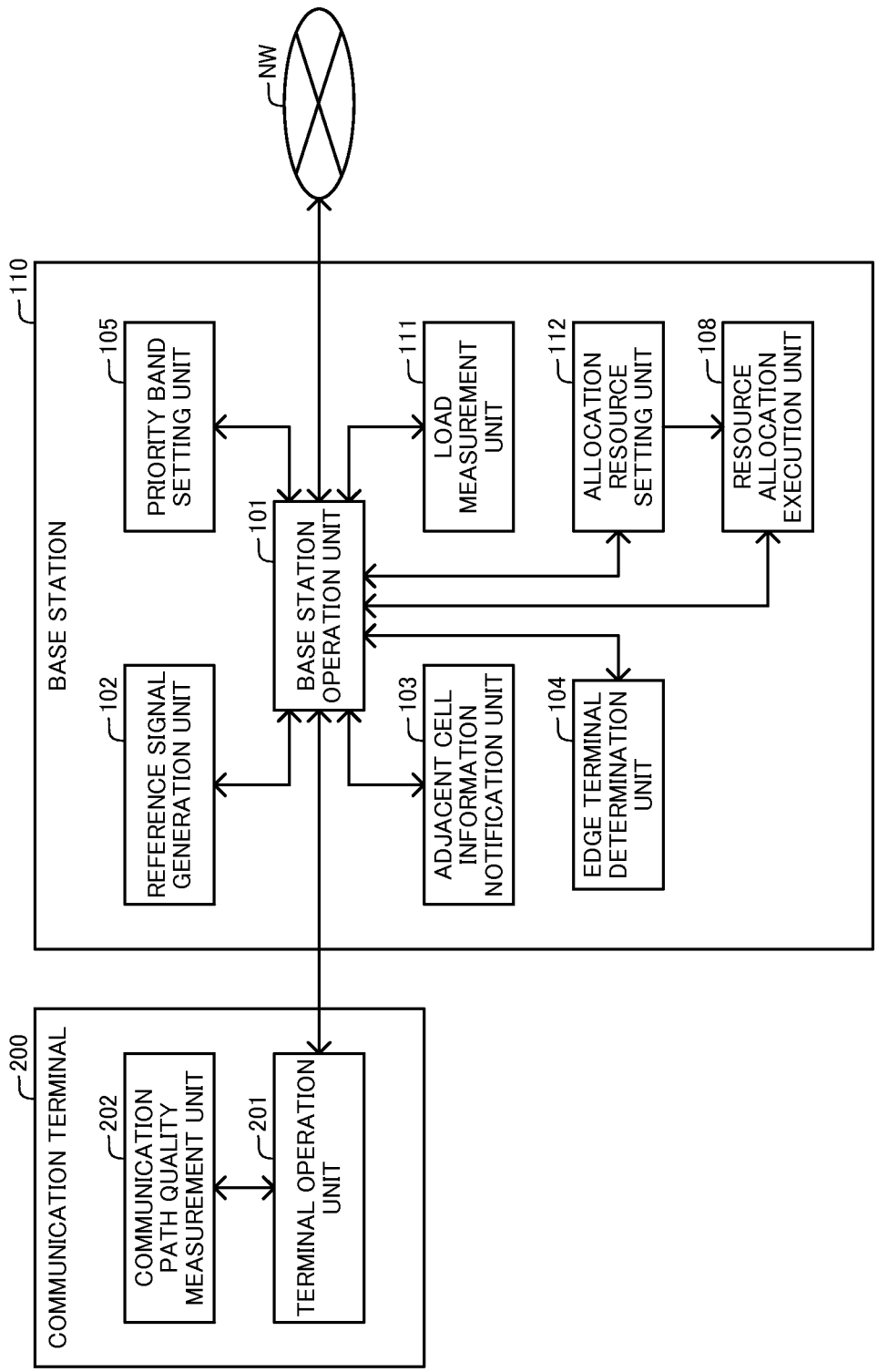
FIG. 13 is a block diagram representing a schematic function of a radio communication system according to a second illustrative embodiment of the present invention.

As shown in FIG. 13, the radio communication system 1000 according to the second illustrative embodiment includes a base station 110, instead of the base station 100.

A function of the base station 110 is a function that the load measurement unit 106 of the function of the base station 100 according to the first illustrative embodiment is replaced with a load measurement unit 111 and the allocation resource setting unit 107 of the function of the base station 100 is replaced with an allocation resource setting unit 112.

Like the load measurement unit 106, the load measurement unit 111 (part of the load information acquisition unit) has a function of measuring a load on an own cell and generating (acquiring) load information representing the measured load. Besides, unlike the load measurement unit 106, the load measurement unit 111 has a function of transmitting (notifying) the generated load information to each of the adjacent base stations 110 . . . via the base station operation unit 101.

The base station operation unit 101 (part of the load information acquisition unit) has a function of receiving (acquiring) load information on an adjacent cell from the adjacent base station.

Unlike the allocation resource setting unit 107, the allocation resource setting unit 112 has a function of, for each adjacent cell, determining a threshold load based on the load information on the adjacent cell received by the base station operation unit 101.

Furthermore, the allocation resource setting unit 112 has a function of, for each adjacent cell, determining whether the load on the own cell is smaller than the threshold load determined for the adjacent cell. In addition, the allocation resource setting unit 112 has a function of setting the allocatable radio resource range based on the result of the determination and the presence/absence of reception of priority band information.

Operation

Figure 14:
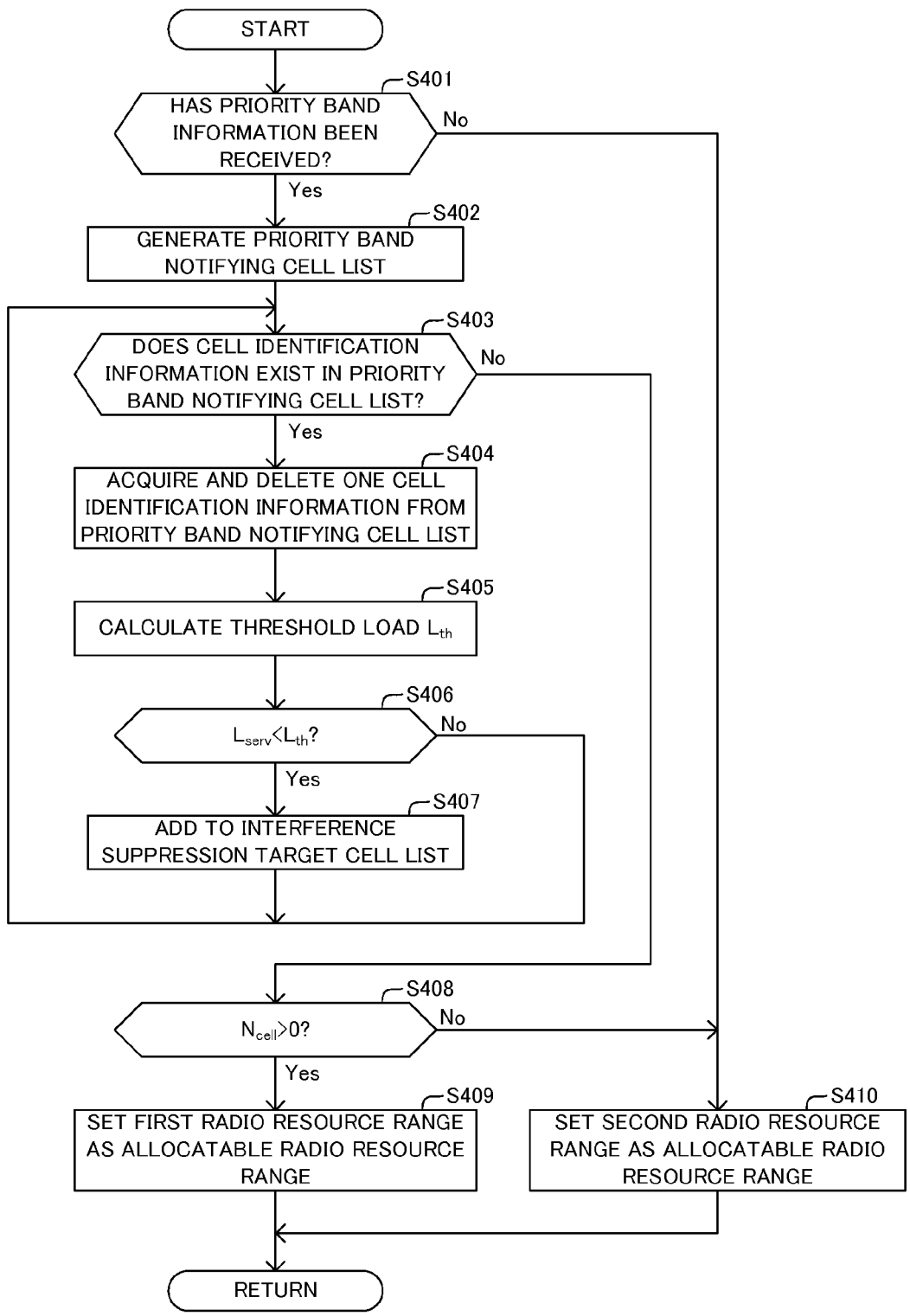
FIG. 14 is a flowchart showing the operation performed by a base station according to the second illustrative embodiment of the present invention to set an allocatable radio resource range.

The base station 110 according to the second illustrative embodiment is configured to perform a function shown by a flowchart in FIG. 14, instead of the function shown in FIG. 12. The base station 110 performs the function shown in FIG. 14, thereby setting an allocatable radio resource range based on a load measured for an own cell, a load measured for an adjacent cell, and presence/absence of reception of priority band information from the adjacent base station 110.

Upon start of processing of the flowchart shown in FIG. 14, the base station 110 determines whether priority band information has already been received from any of the adjacent base stations 110 . . . (presence/absence of reception of priority band information) (operation S401).

At first, a case in which the base station 110 has already received priority band information will be assumed. In this case, the base station 110 determines "Yes," and proceeds to operation S402 to generate a priority band notifying cell list. The priority band notifying cell list includes cell identification information for identifying an adjacent cell allocated to each of the adjacent base stations 110 . . . having transmitted the priority band information.

Next, the base station 110 determines whether cell identification information exists in the priority band notifying cell list (operation S403). Herein, a case in which cell identification information exists in the priority band notifying cell list will be assumed.

In this case, the base station 110 determines "Yes," and proceeds to operation S404 to acquire only one cell identification information from the priority band notifying cell list and delete the acquired cell identification information from the priority band notifying cell list.

Next, as shown in Formula 3, the base station 110 calculates a value obtained by adding a load L(n) represented by load information on an adjacent cell identified by the acquired cell identification information (in this embodiment, a cell number n) to a preset margin value ΔL, as a threshold load $L_{th}$ for the adjacent cell (operation S405).

$$L_{th}=L(n)+\Delta L \qquad \text{[Formula 3]}$$

The base station 110 may be configured to calculate a value obtained by multiplying the load L(n) on the adjacent cell by a preset factor, as the threshold load $L_{th}$ for the adjacent cell.

Next, the base station 110 determines whether a load $L_{serv}$ represented by load information on the own cell is smaller than the threshold load $L_{th}$ calculated at operation S405 described above (operation S406).

In a case that the load $L_{serv}$ on the own cell is smaller than the calculated threshold load $L_{th}$, the base station 110 determines "Yes," and proceeds to operation S407 to add the cell identification information acquired at operation S404 described above to an interference suppression target cell list. Next, the base station 110 returns to operation S403, and repeatedly executes the processes from operation S403 to operation S407 until all of the cell identification information are deleted from the priority band notifying cell list.

On the other hand, in a case that the load $L_{serv}$ on the own cell is equal to or more than the calculated threshold load $L_{th}$, the base station 110 determines "No" at operation S406, and returns to operation S403 without executing the process of operation S407.

After that, when all the cell identification information are deleted from the priority band notifying cell list, the base station 110 determines "No" at operation S403 and proceeds to operation S408. Then, the base station 110 determines whether a number $N_{cell}$ of the cell identification information included in the interference suppression target cell list is larger than 0.

In a case that the number $N_{cell}$ of the cell identification information included in the interference suppression target cell list is larger than 0, the base station 110 determines "Yes," and proceeds to operation S409 to set the first radio resource range as the allocatable radio resource range. After that, the base station 110 ends the processing of this flowchart.

On the other hand, in a case that the number $N_{cell}$ of the cell identification information included in the interference suppression target cell list is 0, the base station 110 determines "No," and proceeds to operation S410 to set the second radio resource range as the allocatable radio resource range. After that, the base station 110 ends the processing of this flowchart.

Further, in a case that the base station 110 has not received any priority band information, the base station 110 determines "No" at operation S401, and proceeds to operation S410 to set the second radio resource range as the allocatable radio resource range. After that, the base station 110 ends the processing of this flowchart.

As described above, according to the base station 110 of the second illustrative embodiment of the present invention, it is possible to properly set a threshold load based on a load on an adjacent cell. In a case that a load on an adjacent cell is large, throughputs for the communication terminals 200 . . . are small with respect to the adjacent cell. Consequently, according to the base station 110, it is possible to avoid that, for example, in a cell that a throughput is small with respect to an adjacent cell, the throughput further decreases.

Third Illustrative Embodiment

Figure 15:
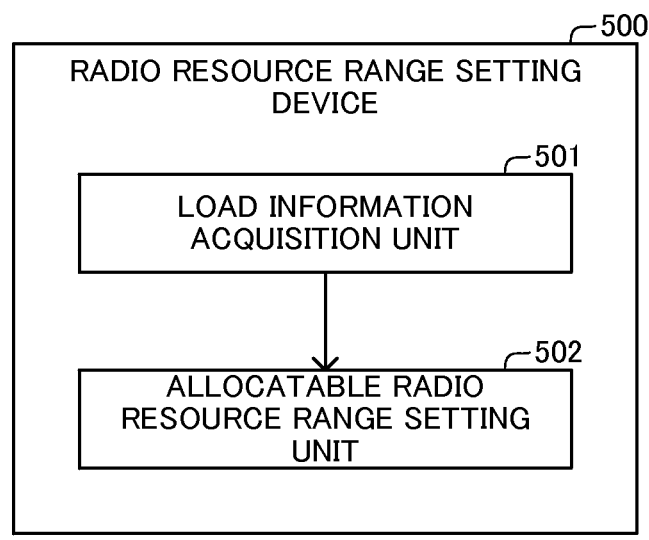
FIG. 15 is a block diagram representing a schematic function of a radio resource range setting device according to a third illustrative embodiment of the present invention.

Next, a radio resource range setting device according to a third illustrative embodiment of the present invention will be described with reference to FIG. 15.

A radio resource range setting device 500 according to the third illustrative embodiment includes:

a load information acquisition unit (a load information acquisition means) 501 configured to acquire load information representing a load of radio communication performed between a base station and a plurality of communication terminals performing radio communication with the base station by using a radio resource allocated by the base station; and an allocatable radio resource range setting unit (an allocatable radio resource range setting means) 502 configured to, in a case that the load represented by the acquired load information is smaller than a predetermined threshold load, set a first radio resource range as an allocatable radio resource range that is a range of a radio resource that the base station can allocate to each of the plurality of communication terminals and, on the other hand, in a case that the load represented by the acquired load information is larger than the threshold load, set a second radio resource range larger than the first radio resource range as the allocatable radio resource range.

According to this, in a case that a load of radio communication is comparatively small, a radio resource is allocated to a communication terminal from a relatively small radio resource range. Consequently, it is possible to increase the communication path quality in an adjacent cell, which is a communication area adjacent to an own cell that is a communication area allocated to a base station.

On the other hand, in a case that a load of radio communication is comparatively large, a radio resource is allocated to a communication terminal from a relatively large radio resource range. Consequently, it is possible to prevent a throughput for a communication terminal in an own cell from becoming extremely small.

Thus, according to the configuration described above, it is possible to prevent a throughput for a communication terminal from becoming extremely small while increasing the communication path quality.

Although the present invention has been described above with reference to the illustrative embodiments, the present invention is not limited to the illustrative embodiments described above. The configuration and details of the present invention can be altered in various manners that can be understood by those in the art within the scope of the present invention.

For example, load information may be information representing a delay time required from when data to be communicated between a base station and a communication terminal is generated to when communication of the data is completed. Moreover, load information may be information representing a frequency use rate that is a ratio of a communication band already allocated to any of a plurality of communication terminals to the whole communication band that can be allocated to the plurality of communication terminals.

Further, in the respective illustrative embodiments described above, as communication path quality information, RSRQ of a reference signal is used, but RSRP (Reference Signal Received Power) may be used. Moreover, as communication path quality information, path loss, geometry, or SINR (Signal to Noise Interference Ratio) of a reference signal may be used.

Further, in the respective illustrative embodiments described above, a base station configures a radio resource range setting device. A radio communication system in a modified example of the respective illustrative embodiments may be equipped with a radio resource range setting device as a device independent of a base station.

In this modified example, the radio resource range setting device is configured to receive load information from a base station and thereby acquire the load information. Moreover, the radio resource range setting device transmits allocatable radio resource range information representing a set allocatable radio resource range to a base station (an allocatable radio resource range information transmission unit). The base station allocates a radio resource to a communication terminal based on the received allocatable radio resource range information.

Further, the present invention can also be applied to an uplink (a communication link for transmitting data from a communication terminal to a base station). In the case of the LTE, by using HII (High Interference Indication) instead of the RNTP, the radio communication system according to the respective illustrative embodiments can be operated as a radio communication system that the present invention is applied to an uplink.

Further, in the case of an uplink, transmission power is set to a larger value as path loss increases. Therefore, it can be considered that a communication terminal that transmits and receives a radio signal comparatively largely interfering with a radio signal in an adjacent cell is usually an edge terminal.

Accordingly, unlike when the present invention is applied to a downlink, a need to limit transmission power of a center terminal is low. Then, in the case of applying the present invention to an uplink, it is preferable to use a radio resource range that a communication band is the whole available communication band and transmission power is the abovementioned reference transmission power, as a first radio resource range for a center terminal.

The respective functions of the radio communication system in the respective illustrative embodiments are realized by the CPU's execution of a program (software), but may be realized by hardware such as a circuit.

Further, the program in the respective illustrative embodiments is stored in the storage device, but may be stored in a computer-readable recording medium. For example, the recording medium is a portable medium such as a flexible disk, an optical disk, a magneto-optical disk and a semiconductor memory.

Further, as another modified example of the respective illustrative embodiments, any combination of the aforementioned illustrative embodiments and modified examples may be employed.

Supplementary Notes

The whole or part of the illustrative embodiments disclosed above can be described as, but not limited to, the following supplementary notes.

Supplementary Note 1

A radio resource range setting device, comprising:
a load information acquisition unit configured to acquire load information representing a load of radio communication performed between a base station and a plurality of communication terminals performing radio communication with the base station by using a radio resource allocated by the base station; and
an allocatable radio resource range setting unit configured to, in a case that the load represented by the acquired load information is smaller than a predetermined threshold load, set a first radio resource range as an allocatable radio resource range that is a range of a radio resource that the base station can allocate to each of the plurality of communication terminals and, on the other hand, in a case that the load represented by the acquired load information is larger than the threshold load, set a second radio resource range larger than the first radio resource range as the allocatable radio resource range.

According to this, in a case that a load of radio communication is comparatively small, a radio resource is allocated to a communication terminal from a relatively small radio resource range. Therefore, it is possible to increase a communication path quality in an adjacent cell, which is a communication area adjacent to an own cell that is a communication area allocated to a base station.

On the other hand, in a case that a load of radio communication is comparatively large, a radio resource is allocated to a communication terminal from a relatively large radio resource range. Therefore, it is possible to prevent a throughput for a communication terminal in the own cell from becoming extremely small.

Thus, according to the configuration described above, it is possible to prevent a throughput for a communication terminal from becoming extremely small while increasing the communication path quality.

Supplementary Note 2

The radio resource range setting device according to Supplementary Note 1, comprising:
a priority band information acquisition unit configured to acquire priority band information representing a priority band that is a communication band used preferentially for radio communication in a communication area adjacent to a communication area allocated to the base station; and
a communication path quality information acquisition unit configured to, for each of the plurality of communication terminals, acquire communication path quality information representing a communication path quality that is a quality of a communication path between the communication terminal and the base station,
wherein the allocatable radio resource range setting unit is configured to use a range of a radio resource that a communication band is a communication band except the priority band represented by the acquired priority band information and transmission power is preset reference transmission power, as the first radio resource range for a communication terminal whose communication path quality represented by the acquired communication path quality information is lower than a preset threshold quality, and use a range of a radio resource that transmission power is limitation transmission power smaller than the reference transmission power, as the first radio resource range for a communication terminal whose communication path quality represented by the acquired communication path quality information is higher than the threshold quality.

Supplementary Note 3

The radio resource range setting device according to Supplementary Note 1 or 2, wherein the allocatable radio resource range setting unit is configured to use a preset value as the threshold load.

Supplementary Note 4

The radio resource range setting device according to Supplementary Note 1 or 2, wherein:
the load information acquisition unit is configured to acquire load information for an own cell that is a communication area allocated to the base station, and load information for an adjacent cell that is a communication area adjacent to the own cell; and
the allocatable radio resource range setting unit is configured to determine the threshold load based on the acquired load information for the adjacent cell.

According to this, it is possible to appropriately set a threshold load based on a load on an adjacent cell. In a case that a load on the adjacent cell is large, a throughput for a communication terminal is small with respect to the adjacent cell. Therefore, according to the configuration described above, it is possible to avoid that, for example, in a cell that a throughput is small with respect to the adjacent cell, the throughput is further decreased.

Supplementary Note 5

The radio resource range setting device according to any of Supplementary Notes 1 to 4, wherein the load information is information representing a number of communication terminals that data to be communicated with the base station exists.

According to this, the number of communication terminals that data to be communicated with the base station exists has a comparatively large correlation with throughputs for the communication terminals. Therefore, by configuring the radio resource range setting device as described above, it is possible to more securely avoid that a throughput for a communication terminal becomes extremely small.

Supplementary Note 6

The radio resource range setting device according to any of Supplementary Notes 1 to 4, wherein the load information is information representing a delay time required from generation of data to be communicated between the base station and the communication terminal to completion of communication of the data.

According to this, the delay time has a comparatively large correlation with a throughput for a communication terminal. Therefore, by configuring the radio resource range setting device as described above, it is possible to more securely avoid that a throughput for a communication terminal becomes extremely small.

Supplementary Note 7

The radio resource range setting device according to any of Supplementary Notes 1 to 4, wherein the load information is information representing a frequency use rate that is a ratio of a communication band already allocated to any of the plurality of communication terminals to the whole communication band allocatable to the plurality of communication terminals.

According to this, the frequency use rate has a comparatively large correlation with a throughput for a communication terminal. Therefore, by configuring the radio resource range setting device as described above, it is possible to more securely avoid that a throughput for a communication terminal becomes extremely small.

Supplementary Note 8

The radio resource range setting device according to any of Supplementary Notes 1 to 7, wherein the load information acquisition unit is configured to receive the load information from the base station, thereby acquiring the load information, the radio resource range setting device further comprising an allocatable radio resource range information transmission unit configured to transmit allocatable radio resource range information representing the set allocatable radio resource range to the base station.

Supplementary Note 9

The radio resource range setting device according to any of Supplementary Notes 1 to 8, the radio resource range setting device configuring the base station.

Supplementary Note 10

A radio resource range setting method, comprising:
acquiring load information representing a load of radio communication performed between a base station and a plurality of communication terminals performing radio communication with the base station by using a radio resource allocated by the base station; and
setting a first radio resource range as an allocatable radio resource range that is a range of a radio resource that the base station can allocate to each of the plurality of communication terminals in a case that the load represented by the acquired load information is smaller than a predetermined threshold load, whereas setting a second radio resource range larger than the first radio resource range as the allocatable radio resource range in a case that the load represented by the acquired load information is larger than the threshold load.

Supplementary Note 11

The radio resource range setting method according to Supplementary Note 10, comprising:
acquiring priority band information representing a priority band that is a communication band used preferentially for radio communication in a communication area adjacent to a communication area allocated to the base station;
for each of the plurality of communication terminals, acquiring communication path quality information representing a communication path quality that is a quality of a communication path between the communication terminal and the base station; and
using a range of a radio resource that a communication band is a communication band except the priority band represented by the acquired priority band information and transmission power is preset reference transmission power, as the first radio resource range for a communication terminal whose communication path quality represented by the acquired communication path quality information is lower than a preset threshold quality, and using a range of a radio resource that transmission power is limitation transmission power smaller than the reference transmission power, as the first radio resource range for a communication terminal whose communication path quality represented by the acquired communication path quality information is higher than the threshold quality.

Supplementary Note 12

The radio resource range setting method according to Supplementary Note 10 or 11, comprising using a preset value as the threshold load.

Supplementary Note 13

The radio resource range setting method according to Supplementary Note 10 or 11, comprising:
acquiring load information for an own cell that is a communication area allocated to the base station, and load information for an adjacent cell that is a communication area adjacent to the own cell; and
determining the threshold load based on the acquired load information for the adjacent cell.

Supplementary Note 14

The radio resource range setting method according to any of Supplementary Notes 10 to 13, wherein the load information is information representing a number of communication terminals that data to be communicated with the base station exists.

Supplementary Note 15

The radio resource range setting method according to any of Supplementary Notes 10 to 13, wherein the load information is information representing a delay time required from generation of data to be communicated between the base station and the communication terminal to completion of communication of the data.

Supplementary Note 16

The radio resource range setting method according to any of Supplementary Notes 10 to 13, wherein the load information is information representing a frequency use rate that is a ratio of a communication band already allocated to any of the plurality of communication terminals to the whole communication band allocatable to the plurality of communication terminals.

Supplementary Note 17

A computer-readable recording medium storing a radio resource range setting program comprising instructions for causing an information processing device to execute processes of:
acquiring load information representing a load of radio communication performed between a base station and a plurality of communication terminals performing radio communication with the base station by using a radio resource allocated by the base station; and
setting a first radio resource range as an allocatable radio resource range that is a range of a radio resource that the base station can allocate to each of the plurality of communication terminals in a case that the load represented by the acquired load information is smaller than a predetermined threshold load, whereas setting a second radio resource range larger than the first radio resource range as the allocatable radio resource range in a case that the load represented by the acquired load information is larger than the threshold load.

Supplementary Note 18

The recording medium according to Supplementary Note 17, wherein the radio resource range setting program further comprises instructions for causing the information processing device to execute processes of:

acquiring priority band information representing a priority band that is a communication band used preferentially for radio communication in a communication area adjacent to a communication area allocated to the base station;

for each of the plurality of communication terminals, acquiring communication path quality information representing a communication path quality that is a quality of a communication path between the communication terminal and the base station; and using a range of a radio resource that a communication band is a communication band except the priority band represented by the acquired priority band information and transmission power is preset reference transmission power, as the first radio resource range for a communication terminal whose communication path quality represented by the acquired communication path quality information is lower than a preset threshold quality, and using a range of a radio resource that transmission power is limitation transmission power smaller than the reference transmission power, as the first radio resource range for a communication terminal whose communication path quality represented by the acquired communication path quality information is higher than the threshold quality.

Supplementary Note 19

A radio resource range setting device, comprising:

a load information acquisition means for acquiring load information representing a load of radio communication performed between a base station and a plurality of communication terminals performing radio communication with the base station by using a radio resource allocated by the base station; and an allocatable radio resource range setting means for, in a case that the load represented by the acquired load information is smaller than a predetermined threshold load, setting a first radio resource range as an allocatable radio resource range that is a range of a radio resource that the base station can allocate to each of the plurality of communication terminals and, on the other hand, in a case that the load represented by the acquired load information is larger than the threshold load, setting a second radio resource range larger than the first radio resource range as the allocatable radio resource range.

INDUSTRIAL APPLICABILITY

The present invention is applicable to, for example, a radio communication system including a base station and a communication terminal performing radio communication with the base station.

What is claimed is:

1. A radio resource range setting device comprising:
a load information acquisition unit configured to acquire load information representing a load of radio communication performed between a base station and a plurality of communication terminals performing radio communication with the base station by using a radio resource allocated by the base station; and
an allocatable radio resource range setting unit configured to set in response to the acquired load information, from a first radio resource range and a second radio resource range, a radio resource range that the base station can allocate to an edge communication terminal whose channel quality is less than a predetermined threshold,
wherein the allocatable radio resource range setting unit is configured to set the first radio resource range as the radio resource range in a case that the acquired load information is smaller than a predetermined threshold and set the second radio resource range, which is larger than the first radio resource range, as the radio resource range in a case that the acquired load information is larger than the threshold.

2. The radio resource range setting device according to claim 1, wherein the allocatable radio resource range setting unit is configured to set in response to the acquired load information, from the first radio resource range and the second radio resource range, a radio resource range that the base station can allocate to a center communication terminal whose channel quality is more than the predetermined threshold.

3. The radio resource range setting device according to claim 1, further comprises,
a priority band information acquisition unit configured to acquire priority band information representing a priority band that is a communication band used preferentially for radio communication in a communication area adjacent to a communication area allocated to the base station; and
a communication path quality information acquisition unit configured to, for the plurality of communication terminals, acquire communication path quality information representing a communication path quality that is a quality of a communication path between the edge communication terminal and the base station.

4. The radio resource range setting device according to claim 1, wherein the allocatable radio resource range setting unit is configured to use a preset value as the threshold load.

5. The radio resource range setting device according to claim 1, wherein:
the load information acquisition unit is configured to acquire load information for an own cell that is a communication area allocated to the base station, and load information for an adjacent cell that is a communication area adjacent to the own cell; and
the allocatable radio resource range setting unit is configured to determine the threshold load based on the acquired load information for the adjacent cell.

6. The radio resource range setting device according to claim 1, wherein the load information is information representing a number of the communication terminals that data to be communicated with the base station exists.

7. The radio resource range setting device according to claim 1, wherein the load information is information representing a delay time required from generation of data to be communicated between the base station and the edge communication terminal to completion of communication of the data.

8. The radio resource range setting device according to claim 1, wherein the load information is information representing a frequency use rate that is a ratio of a communication band already allocated to any of the plurality of communication terminals to the whole communication band allocatable to the plurality of communication terminals.

9. The radio resource range setting device according to claim 1, wherein the load information acquisition unit is configured to receive the load information from the base station, thereby acquiring the load information, the radio resource range setting device further comprising an allocatable radio resource range information transmission unit configured to transmit allocatable radio resource range information representing the set allocatable radio resource range to the base station.

10. The radio resource range setting device according to claim 1, wherein the radio resource range setting device configuring the base station.

11. The radio resource range setting device according to claim 3, wherein the allocatable radio resource range setting unit is configured to use a range of a radio resource that a communication band is a communication band except the priority band represented by the acquired priority band information and transmission power is preset reference transmission power, as the first radio resource range for the edge communication terminal, and use a range of a radio resource that transmission power is limitation transmission power smaller than the reference transmission power, as the first radio resource range for a communication terminal whose communication path quality represented by the acquired communication path quality information is higher than the threshold quality.

12. A radio resource range setting method in a resource range setting device, comprising:
acquiring load information representing a load of radio communication performed between a base station and a plurality of communication terminals performing radio communication with the base station by using a radio resource allocated by the base station;
setting in response to the acquired load information, from a first radio resource range and a second radio resource range, a radio resource range that the base station can allocate to an edge communication terminal whose channel quality is less than a predetermined threshold; and
setting the first radio resource range as the radio resource range in a case that the acquired load information is smaller than a predetermined threshold and set the second radio resource range, which is larger than the first radio resource range, as the radio resource range in a case that the acquired load information is larger than the threshold.

13. The radio resource range setting method according to claim 12, further comprises,
setting in response to the acquired load information, from the first radio resource range and the second radio resource range, a radio resource range that the base station can allocate to a center communication terminal whose channel quality is more than the predetermined threshold.

14. The radio resource range setting method according to claim 12, further comprises,
acquiring priority band information representing a priority band that is a communication band used preferentially for radio communication in a communication area adjacent to a communication area allocated to the base station;
for the plurality of communication terminals, acquiring communication path quality information representing a communication path quality that is a quality of a communication path between the edge communication terminal and the base station.

15. The radio resource range setting method according to claim 12, further comprises using a preset value as the threshold load.

16. The radio resource range setting method according to claim 12, further comprises:
acquiring load information for an own cell that is a communication area allocated to the base station, and load information for an adjacent cell that is a communication area adjacent to the own cell; and
determining the threshold load based on the acquired load information for the adjacent cell.

17. The radio resource range setting method according to claim 12, wherein the load information is information representing a number of the communication terminals that data to be communicated with the base station exists.

18. The radio resource range setting method according to claim 12, wherein the load information is information representing a delay time required from generation of data to be communicated between the base station and the edge communication terminal to completion of communication of the data.

19. The radio resource range setting method according to claim 12, wherein the load information is information representing a frequency use rate that is a ratio of a communication band already allocated to any of the plurality of communication terminals to the whole communication band allocatable to the plurality of communication terminals.

20. A non-transitory computer-readable recording medium storing a radio resource range setting program comprising instructions for causing an information processing device to execute processes of:
acquiring load information representing a load of radio communication performed between a base station and a plurality of communication terminals performing radio communication with the base station by using a radio resource allocated by the base station;
setting in response to the acquired load information, from a first radio resource range and a second radio resource range, a radio resource range that the base station can allocate to an edge communication terminal whose channel quality is less than a predetermined threshold; and
setting the first radio resource range as the radio resource range in a case that the acquired load information is smaller than a predetermined threshold and set the second radio resource range, which is larger than the first radio resource range, as the radio resource range in a case that the acquired load information is larger than the threshold.

* * * * *